O. M. FREDD.
METHOD AND TIRE VULCANIZING APPARATUS.
APPLICATION FILED APR. 5, 1921.

1,428,428. Patented Sept. 5, 1922.

WITNESSES

INVENTOR
Oscar M. Fredd
BY
ATTORNEYS

Patented Sept. 5, 1922.

1,428,428

UNITED STATES PATENT OFFICE.

OSCAR M. FREDD, OF HANCOCK, MICHIGAN.

METHOD AND TIRE-VULCANIZING APPARATUS.

Application filed April 5, 1921. Serial No. 458,826.

*To all whom it may concern:*

Be it known that I, OSCAR M. FREDD, a citizen of the United States, and a resident of Hancock, in the county of Houghton and State of Michigan, have invented new and Improved Methods and Tire-Vulcanizing Apparatus, of which the following is a full, clear, and exact description.

The present invention relates to new and useful procedure and improvements in apparatus for vulcanizing tires and it pertains more particularly to the core or former used within the shoe of the tire during the vulcanizing process. These cores or formers as commonly employed are in the form of a pneumatic tube, and it is the primary object of the present invention to provide a device capable of use with cores or formers of the above types.

It is a further object of the invention to provide means by which the cores or formers may be heated independently of the heating medium of the vulcanizing mold.

It is a still further object of the invention to provide a device in which the pressure and the degree of temperature to which the inside of the shoe is subjected may be varied with respect to that of the outside surface of the shoe, as desired.

Referring to the drawings—

Figure 1:
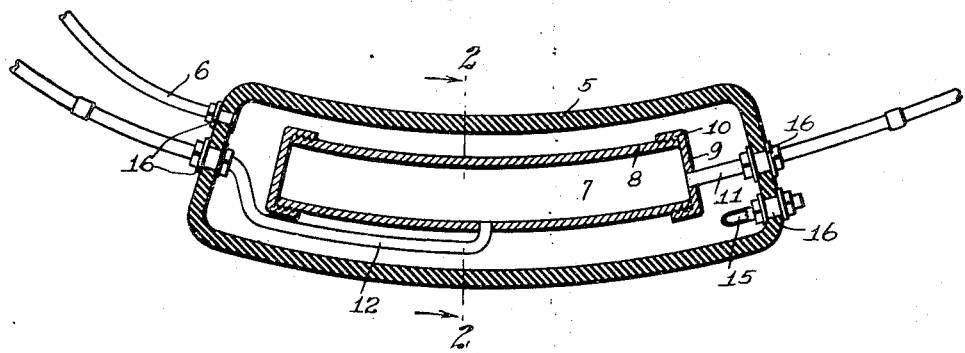
Figure 1 is a longitudinal sectional view of one form of the invention.
Figure 2:
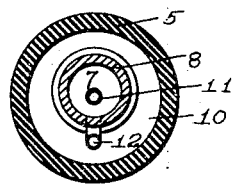
Fig. 2 is transverse sectional view taken on the line 2—2 of Fig. 1.

Referring to the drawings and more particularly to Figs. 1 and 2, the invention is shown as applied to a core or former of the pneumatic type, and in said figures the reference character 5 designates the core or former, and 6 designates the line by means of which air under pressure is introduced to the interior of said core or former. The reference character 7 designates the heating device and the same comprises a tubular member 8 upon the ends of which are soldered caps 9, as indicated by the reference character 10. Leading to one of these caps 9 is a heat-supplying line 11, by means of which steam or other suitable heating medium is introduced into the heating device 7. Leading from the heating device 7 at a point intermediate of its ends, is a pipe 12, and said pipe 12 serves the means for drawing out the products of condensation in instances where steam or the like is used as the heating medium.

Secured in one end of the device, is a closed tube 15, and said tube is so formed and shaped as to provide a receptacle for a thermometer by means of which a reading of the temperature upon the interior of the core or former 5 may be had. The reference character 16 designates fittings, and it is understood that each of the pipes or tubes leading into the interior of the core or former through the walls thereof is provided with these fittings, whereby a tight connection between the several pipes and tubes and the walls of the core or former is had.

I claim:

1. In combination with a pneumatic core or former, and means to apply fluid pressure thereto, for vulcanizing devices, a heating means within the pneumatic core or former, and means for supplying a heating medium to said heating means.

2. In combination with a pneumatic pressure bag, and means for applying fluid pressure thereto, a heating device within the pneumatic bag, and means for supplying a heating medium to the heating device separate from the pressure within the bag.

3. In combination with a pneumatic pressure core or former, and means for applying fluid pressure thereto, a heating device within the pneumatic core or former, means for supplying a heating medium to said heating device, and means for extracting the products of condensation therefrom.

4. In combination with a core or former of the pneumatic pressure type, and means for applying fluid pressure thereto, a heating device within the pneumatic core or former and spaced from the side thereof, and means for supplying a heating medium to said heating device.

5. The combination with a pneumtic pressure bag, of a heating chamber in the bag, a steam supply pipe leading from the chamber out through the bag, and a pipe leading from the bottom of the chamber out through the bag for carrying off the water of condensation, said pipes supporting the heating chamber in the bag in spaced relation thereto.

6. The method herein described of vulcanizing tires, consisting in introducing an inflatable bag into the tire, admitting air under pressure into the bag to inflate the same, and then subjecting the compressed air in the bag to the action of heat to heat the air and thereby the bag.

OSCAR M. FREDD.